United States Patent
Sugiyama et al.

(10) Patent No.: US 10,545,281 B2
(45) Date of Patent: Jan. 28, 2020

(54) BACKLIGHT DEVICE AND LIQUID CRYSTAL DISPLAY DEVICE COMPRISING THE SAME

(71) Applicant: Japan Display Inc., Tokyo (JP)

(72) Inventors: Ken Sugiyama, Tokyo (JP); Koji Hiramoto, Tokyo (JP); Kazunari Nishita, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/889,048

(22) Filed: Feb. 5, 2018

(65) Prior Publication Data

US 2018/0224595 A1 Aug. 9, 2018

(30) Foreign Application Priority Data

Feb. 6, 2017 (JP) ................... 2017-019570

(51) Int. Cl.
*F21V 8/00* (2006.01)
(52) U.S. Cl.
CPC ........... *G02B 6/0088* (2013.01); *G02B 6/009* (2013.01); *G02B 6/0055* (2013.01); *G02B 6/0068* (2013.01); *G02B 6/0083* (2013.01)
(58) Field of Classification Search
CPC .... G02B 6/0088; G02B 6/009; G02B 6/0068; G02B 6/0083; G02B 6/0055
USPC ......................................................... 349/58
See application file for complete search history.

(56) References Cited

U.S. PATENT DOCUMENTS

| 6,219,117 | B1 | 4/2001 | Nagakubo et al. |
| 6,313,891 | B1 | 11/2001 | Nagakubo et al. |
| 2009/0067112 | A1* | 3/2009 | Takabayashi ....... G02F 1/13452 361/220 |
| 2009/0079894 | A1* | 3/2009 | Okuda ............. G02F 1/133308 349/58 |
| 2011/0285934 | A1 | 11/2011 | Watanabe |
| 2012/0002130 | A1* | 1/2012 | Watanabe ............ G02B 6/0088 349/60 |
| 2016/0154271 | A1* | 6/2016 | Kim .................. G02F 1/133308 349/58 |
| 2017/0192166 | A1* | 7/2017 | Hsieh ................. G02B 6/0016 |
| 2018/0275331 | A1* | 9/2018 | Harada ............. G02F 1/133615 |

FOREIGN PATENT DOCUMENTS

| JP | 10-170919 A | 6/1998 |
| JP | 2010-26216 A | 2/2010 |
| JP | 5122657 B2 | 1/2013 |

* cited by examiner

*Primary Examiner* — Charles S Chang
(74) *Attorney, Agent, or Firm* — Michael Best & Friedrich LLP

(57) ABSTRACT

According to one embodiment, a backlight device includes a case including a bottom plate formed from a metal plate, a plurality of side plates formed of metal plates along side edges of the bottom plate and a plurality of resin members each embedded into a gap between each adjacent pair of the side plates to form a corner portion, a light guide in the case, an optical sheet on the light guide, and a light source unit in the case, configured to emit light to enter the light guide.

10 Claims, 11 Drawing Sheets

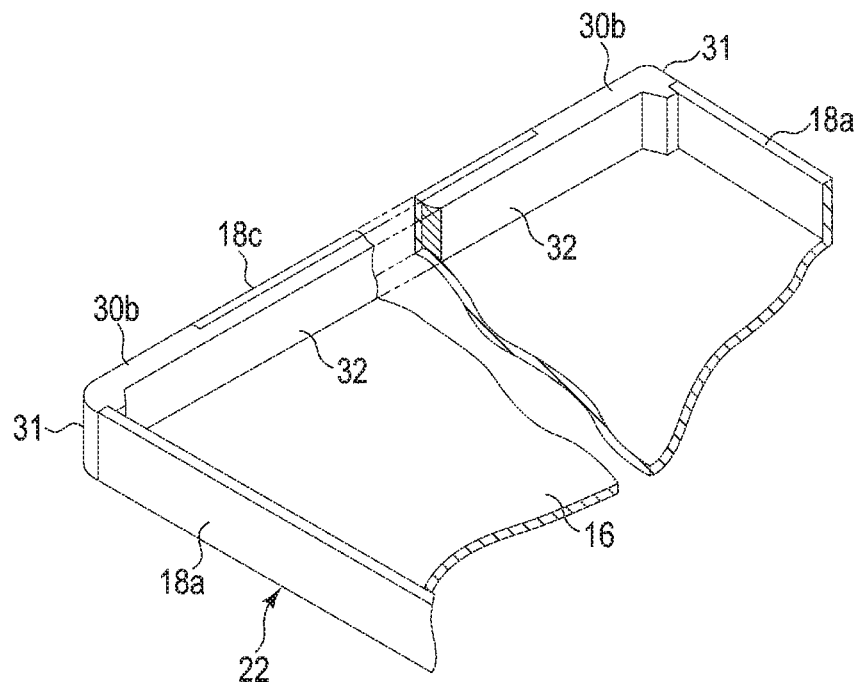
F I G. 5A
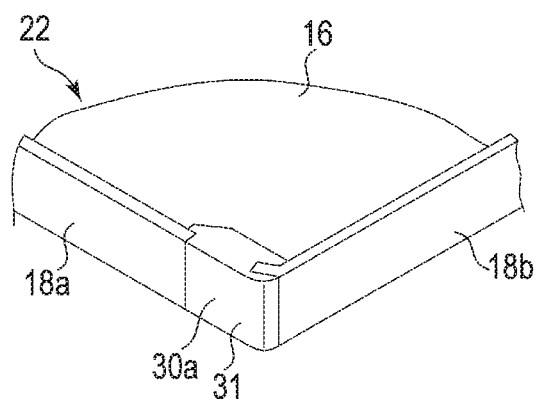
F I G. 5B

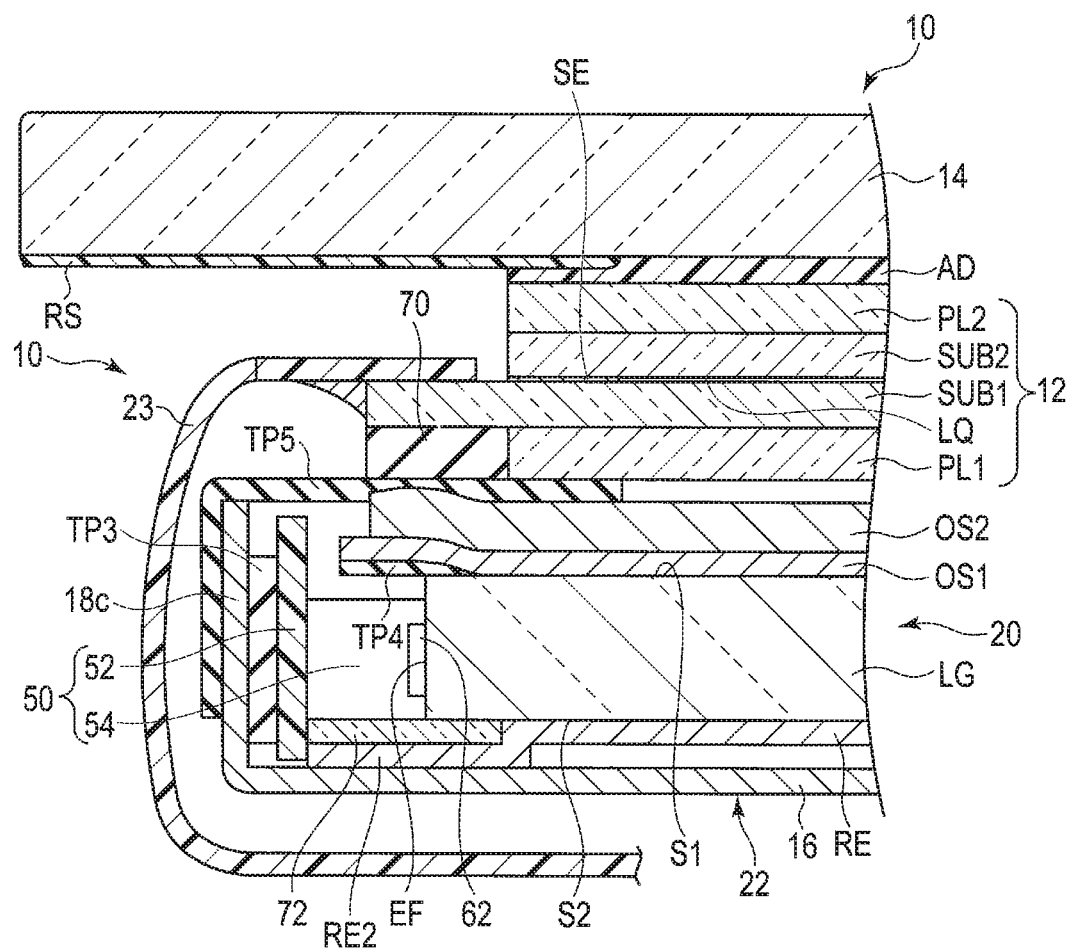
F I G. 10

BACKLIGHT DEVICE AND LIQUID CRYSTAL DISPLAY DEVICE COMPRISING THE SAME

CROSS-REFERENCE TO RELATED APPLICATIONS

This application is based upon and claims the benefit of priority from Japanese Patent Application No. 2017-019570, filed Feb. 6, 2017, the entire contents of which are incorporated herein by reference.

FIELD

Embodiments described herein relate generally to a backlight device and a liquid crystal display device comprising the same.

BACKGROUND

In recent years, liquid crystal display devices are widely used as a display device of smartphones, tablet computers, vehicle-navigation systems, etc. In general, a liquid crystal display device comprises a liquid crystal display panel and a backlight device overlaid on the rear surface of the liquid crystal display panel and illuminates the liquid crystal display panel. The backlight device includes a reflective layer, a light guide, an optical sheet, a light source unit which irradiates light which enters the light guide, and also a case (bezel) made from a metal plate, which accommodates these members. The light source unit includes a wiring board and a plurality of light sources, for example, light-emitting diodes (LEDs) mounted on the wiring board. Meanwhile, such a backlight device is provided, that includes a mold frame provided in the case.

In recent years, as display areas have increased, there has been a continually constant demand for the frames of liquid crystal display devices to become ever narrower and the liquid crystal display devices to become ever thinner. However, the dimensions such as width, thickness, etc., of the frame in the above-described backlight device is approaching the structural limit, and such a demand of further thinning and narrowing the frame is difficult to achieve.

BRIEF DESCRIPTION OF THE DRAWINGS

FIG. 5A is a partially enlarged perspective view showing a part of a case of the backlight device.

FIG. 5B is a partially enlarged perspective view showing another part of the case.

FIG. 10 is a cross sectional view showing a light source-side portion of a liquid crystal display device according to a third embodiment.

DETAILED DESCRIPTION

Various embodiments will be described hereinafter with reference to the accompanying drawings. In general, according to one embodiment, a backlight device comprises a case comprising a bottom plate formed of a metal plate, a plurality of side plates formed of metal plates along side edges of the bottom plate and a plurality of resin members each embedded into a gap between each adjacent pair of the side plates to form a corner portion, a light guide arranged in the case, an optical sheet on the light guide, and a light source unit in the case, configured to emit light to enter the light guide.

Note that the disclosure is presented for the sake of exemplification, and any modification and variation conceived within the scope and spirit of the invention by a person having ordinary skill in the art are naturally encompassed in the scope of invention of the present application. Further, a width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

First Embodiment

Figure 1:
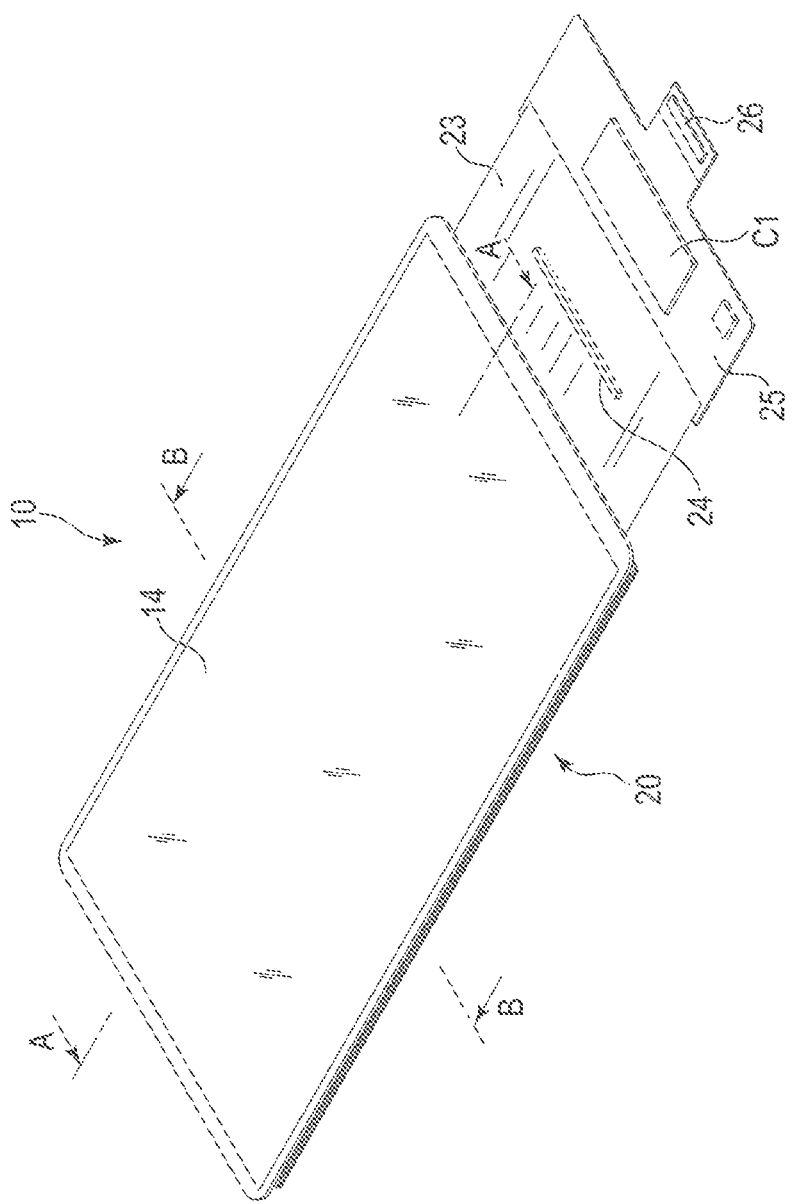
FIG. 1 is a perspective view showing a display surface side of a liquid crystal display device according to a first embodiment.
Figure 2:
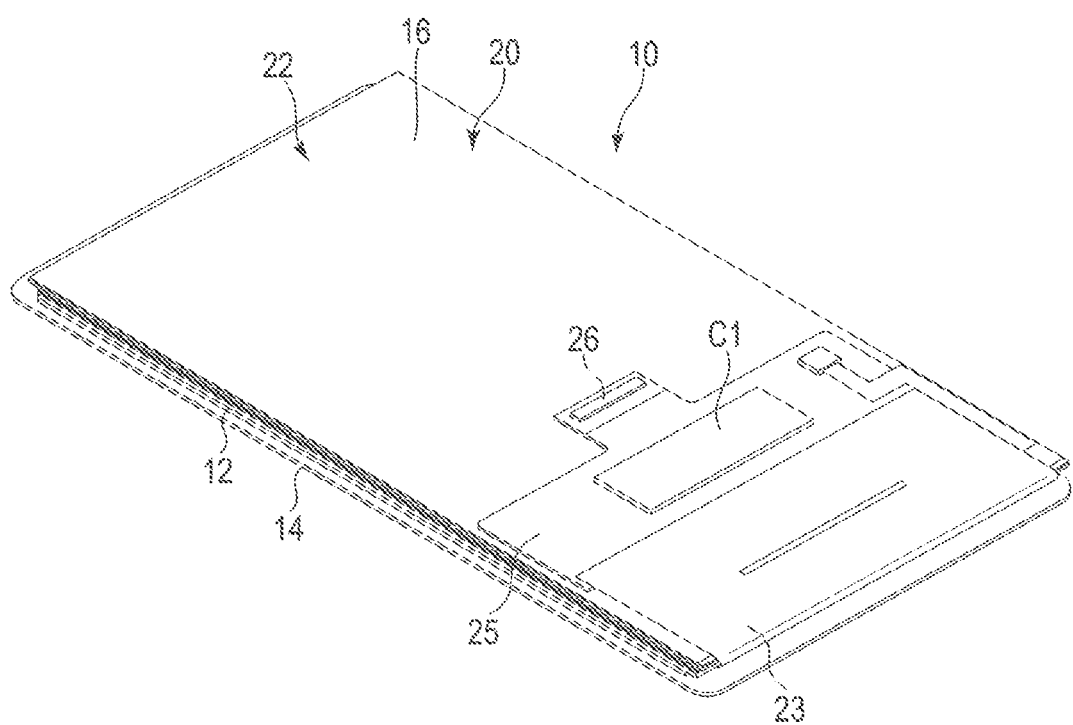
FIG. 2 is a perspective view showing a rear surface side of the liquid crystal display device.
Figure 3:
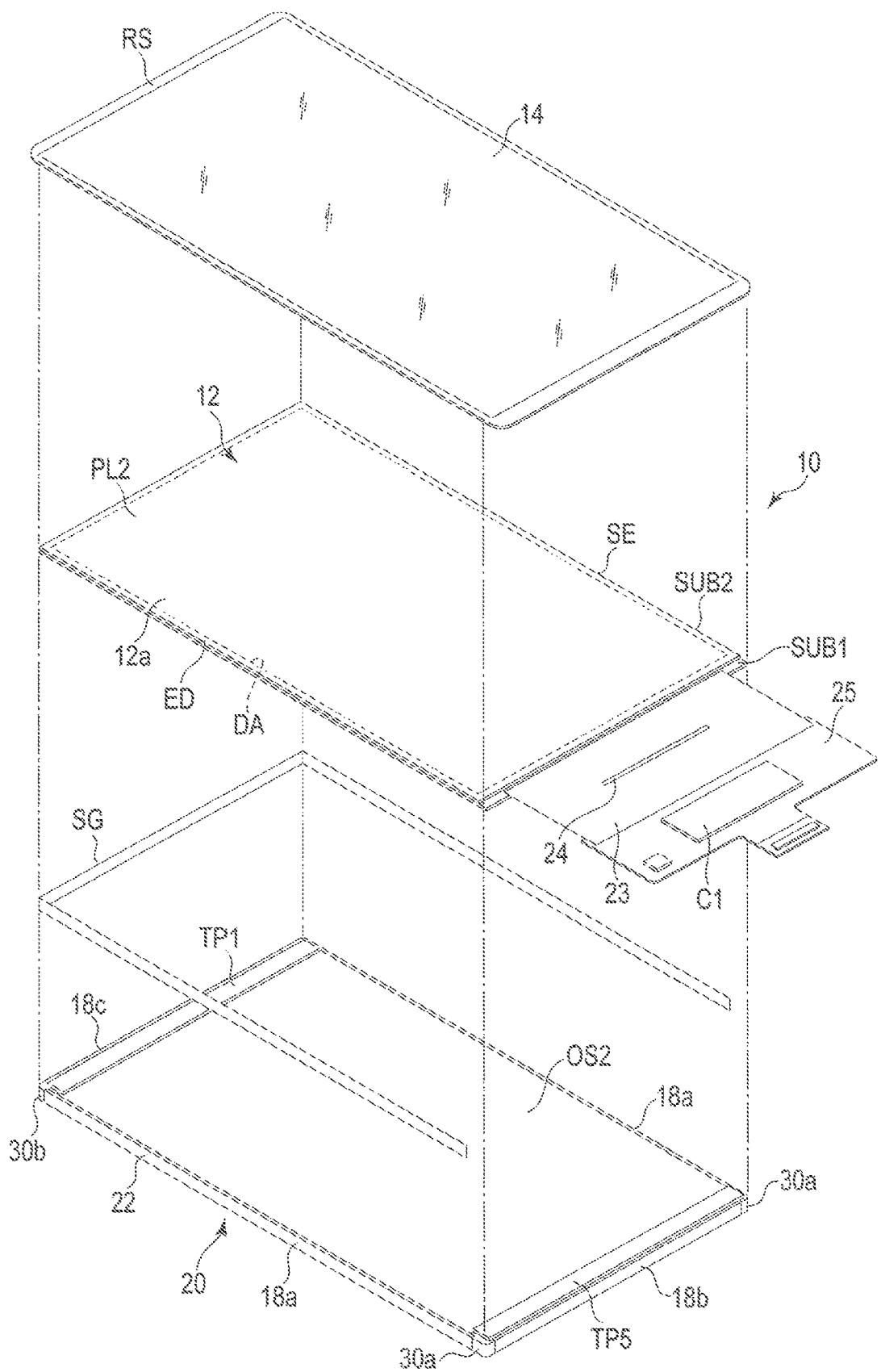
FIG. 3 is an exploded perspective view of the liquid crystal display device.

FIGS. 1 and 2 are perspective views showing, respectively, a display surface side and a rear surface side of a liquid crystal display device according to a first embodiment. FIG. 3 is an exploded perspective view of the liquid crystal display device.

A liquid crystal display device 10 can be incorporated into, for example, various kinds of electronic devices, such as smartphones, tablet computers, mobile phones, notebook PCs, portable game consoles, electronic dictionaries, television sets and car-navigation systems, to be used.

As shown in FIGS. 1, 2 and 3, the liquid crystal display device 10 comprises an active-matrix liquid crystal panel (to be referred to as liquid crystal panel) 12, a transparent cover panel 14 overlaid on a display surface 12a, which is one flat surface of the liquid crystal panel 12 and configured to cover the entire display surface 12a, and a backlight unit (backlight device) 20 as an illumination device provided to face the rear surface, which is the other flat surface of the liquid crystal panel 12.

The liquid crystal panel 12 comprises a rectangular plate-shaped first substrate SUB1, a rectangular plate-shaped second substrate SUB2 disposed to oppose the first substrate SUB1, and a liquid crystal layer LQ held between the first substrate SUB1 and the second substrate SUB2. A peripheral portion of the second substrate SUB2 is attached to the first substrate SUB1 with a frame-shaped sealing member SE.

On the surface of the second substrate SUB2, a polarizer (second polarizer) PL2 is attached to form the display surface 12a. A first polarizer PL1 is attached on a rear surface (a back of the liquid crystal panel 12) of the first substrate SUB1.

On the liquid crystal panel 12, a rectangular display area (active area) DA is provided in a region on an inner side surrounded by the sealing member SE seen in plan view (in other words, hereinafter, when the liquid crystal panel is seen from the normal direction of the display surface). Images are displayed on the display area DA. Further, a rectangular frame area ED is provided around the display area DA. The liquid crystal panel 12 is a transmissive liquid crystal panel having a transmissive display function of displaying imaging by selectively modulating the light from the backlight device 20 in the display area DA.

In the example illustrated, a flexible printed circuit board (FPC) 23 is joined to a short-side edge portion of the first substrate SUB1 and extends from the liquid crystal panel 12 outward. On the FPC 23, semiconductor devices including a driver IC 24 are mounted as signal supply sources which supply signals necessary to drive the liquid crystal panel 12. A sub-FPC 25 is joined to the extending end of the main FPC 23. On the sub-FPC 25, a capacitor C1, a connector 26 and the like are mounted. As shown in FIG. 2, the main FPC 23 and the sub-FPC 25 are folded over along a shorter-side end edge of the first substrate SUB1 and are overlaid on a bottom of the backlight unit 20. As will be described later, the main FPC 23 and the sub-FPC 25 are adhered to the bottom of the backlight unit 20 with an adhesive member such as a double-stick tape.

As shown in FIGS. 1 and 3, the cover panel 14 is formed into a rectangular plate shape from glass or an acrylic transparent resin, for example. The lower surface (rear surface) of the cover panel 14 is adhered to the display surface 12a with an adhesive layer made from a transparent adhesives or adhesive, for example, and covers the entire display surface 12a.

On the lower surface (rear surface, surface on a liquid crystal panel side) of the cover panel 14, a frame-shaped light-shielding layer RS is formed. In the cover panel 14, a region other than the region which opposes the display area DA of the liquid crystal panel 12 is shielded by the light-shielding layer RS. The light-shielding layer RS may be formed on the upper surface (outer surface) of the cover panel 14. Note that the cover panel 14 may be omitted according to the use status of the liquid crystal display device 10.

Next, the backlight device 20 will be described in more detail.

Figure 4:
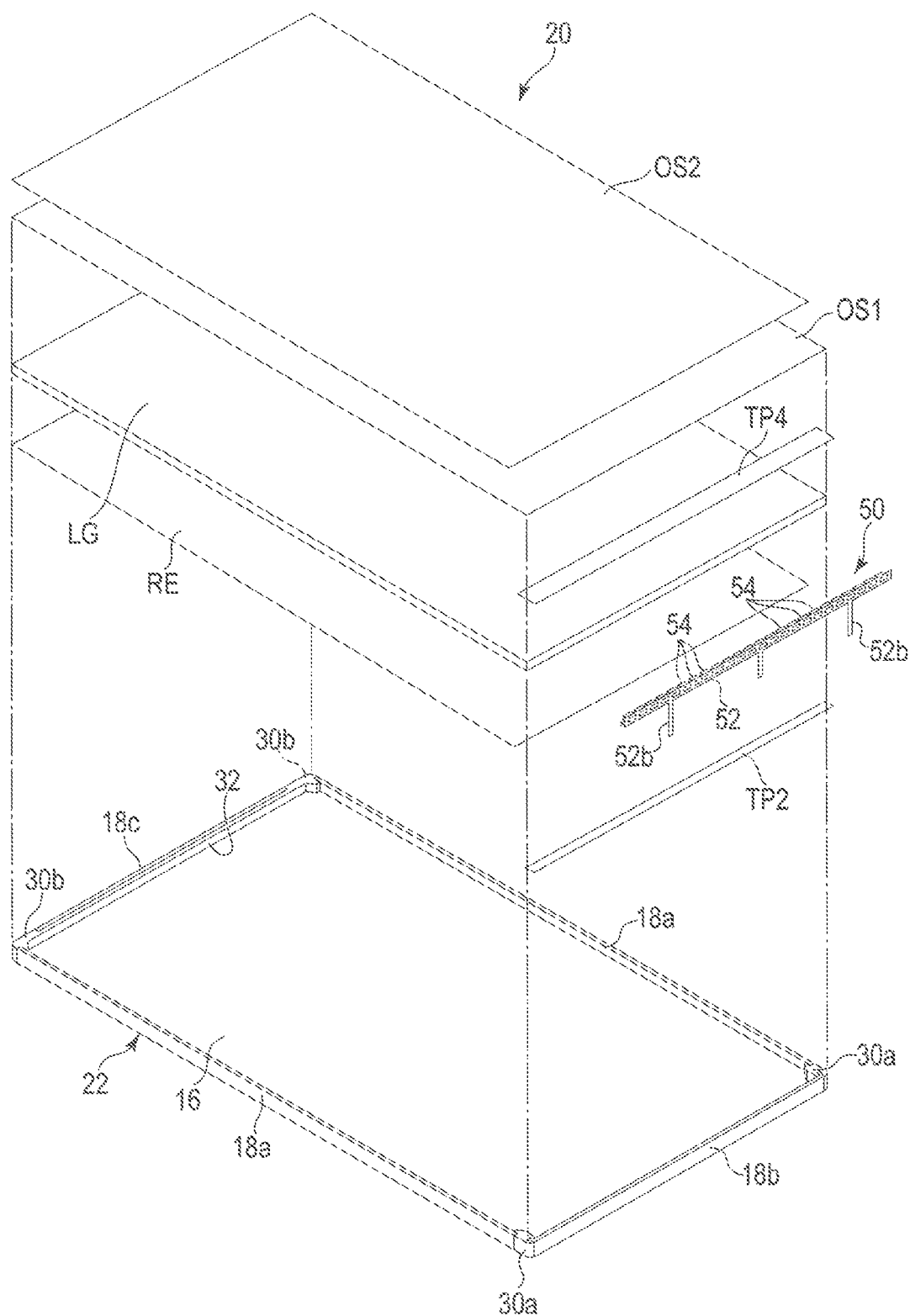
FIG. 4 is an exploded perspective view of a backlight device of the liquid crystal display device.

FIG. 4 is an exploded perspective view of the back light unit 20, FIG. 5A is an enlarged perspective view showing corner portions on the light source side of the case 22, and FIG. 5B is a perspective view showing corner portions and wall portions on an opposite side to the light source of the case 22.

As shown in FIGS. 3 and 4, the backlight unit 20 comprises a rectangular lid-shaped case (bezel) 22, a plurality of optical members laid or arranged in the case 22, and the light source unit 50 which supplies the light which enters into the optical members. The back light unit 20 is disposed to oppose the back of the liquid crystal panel 12 and attached to the liquid crystal panel 12 with, for example, a glue SG.

The case 22 is formed into a rectangular lid by, for example, bending or press-molding a stainless plate material having a thickness of 0.1 mm. The case 22 includes a rectangular bottom plate 16, a pair of long-side plates (first side plates) 18a and a pair of short-side plates (second side plates) 18b, formed to stand on side edges of the bottom plate 16 and integrated as one body. In this embodiment, the bottom plate 16 is formed to be flat without unevenness. In plan view, the bottom plate 16 is formed slightly larger in the dimensions of the first substrate SUB1, and also smaller than the dimensions (length, width) of those of the cover panel 14. Note that such a configuration that the bottom plate 16 comprises an uneven surface is adoptable as well.

The long-side plates 18a are formed to stand substantially perpendicular to the bottom plate 16 and extend over the long sides of the bottom 16 in full length. The short-side plates 18b are formed to stand substantially perpendicular to the bottom plate 16 and extend over the short sides of the bottom 16 in full length.

As shown in FIG. 4, FIG. 5A, and FIG. 5B, in each corner portion of the case 22, the end portion of the long-side plate 18a and the end portion of the short-side plate 18b oppose to be spaced apart from each other. In other words, each long-side plate 18a and each respective short-side plate 18b are not continuously connected to each other, but a gap or a notch is formed in each of these corner portions, which is located between each short-side plate and each respective long-side plate. At the four corner portions of the case 22, a pair of first resin members (corner members) 30a and a pair of second resin members (corner members) 30b are respectively formed. The first resin members 30a and the second resin members 30b are formed from, for example, a black synthetic resin by subjecting it to insert mold into the case 22. The first and the second resin members 30a and 30b are embedded in the gaps between the long-side plates 18a and the short-side plates 18b and 18c, respectively, to joint the long-side plates 18a and the short-side plates 18b and 18c, respectively together. Each of the first and the second resin members 30a and 30b comprises a curved outer surface 31, and the outer surface 31 is located to be flush with the outer surfaces of the long-side plate 18a and the outer surfaces of the short-side plates 18b and 18c. Moreover, the first and second resin members 30a and 30b are formed to have the same height as that of the side plates. Thus, the first and the second resin members 30a and 30b constitute the four corner portions of the case 22.

A pair of the first resin members 30a are provided respectively in both longitudinal ends of the short-side plate 18b adjacent to the light source unit 50, which will be described. A pair of second resin members 30b are provided respectively in both longitudinal ends of the short-side plate 18c located on an opposite side to the light source unit 50. In this embodiment, the pair of the second resin members 30b are jointed to each other with a linear frame member 32 formed from a synthetic resin. The pair of the second resin members 30b and the frame member 32 are formed from a synthetic resin as one integral body. The frame member 32 is provided on the inner surface of the short-side plate 18b so as to be in tight contact therewith, and extends along the short-side plate 18b. The height (width) of the frame member 32 is the same as that of the short-side plate 18b, and the frame member 32 is located to be flush with an edge of the short-side plate 18b.

As described above, the corner portions of the case 22 are formed by the first and second resin members 30a and 30b formed of a black resin, and thus leakage of light from the corner portions of the case 22 can be reliably prevented.

To explain, in the case where corner portions of a case are formed by subjecting a continuous sheet metal (side plate) to drawing process, the corner portions are processed to have a box-like bending structure, which easily increases the radius of curvature of the corner portions. As a result, the packaging space in the case 22 decreases. Moreover, in the drawing process, it is difficult to control the height, and further, if the radius of curvature is decreased, the corner portions are likely to be wrinkled, which may undesirably cause leakage of light.

In contrast, according to this embodiment, the corner portions of the case 22 are formed from the first and second resin members 18a and 18b, and thus the radius of curvature in the corner portions can be much decreased. The resin members can prevent the occurrence of wrinkles and therefore the leakage of light from the corner portions can be reliably prevented. Further, the resin members are easy to manage their heights, thereby making it possible to equalize the height with that of the side plates.

The frame member 32 is formed only in a short-side plate 18c side, and no resin frame member is provided on sides of the pair of long-side plates 18a or an inner side of the short-side plate 18b on a light source side. With this structure, the pair of long side plates 18a can be placed on an inner side by the thickness of the frame member. That is, the distance (width) between the pair of long side plates 18a can be reduced.

Figure 7:
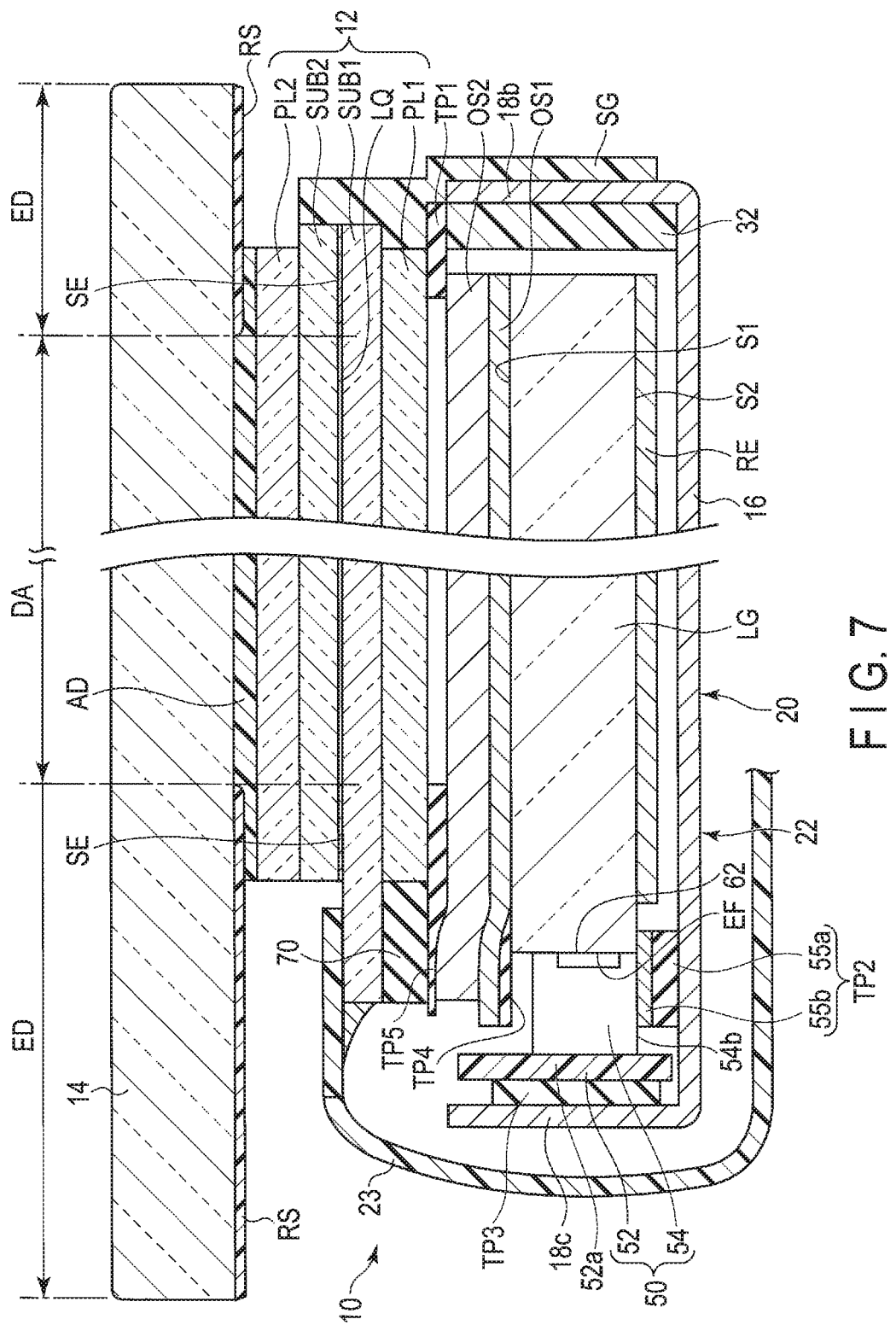
FIG. 7 is a longitudinal sectional view of the liquid crystal display device taken along line A-A of FIG. 1.
Figure 8:
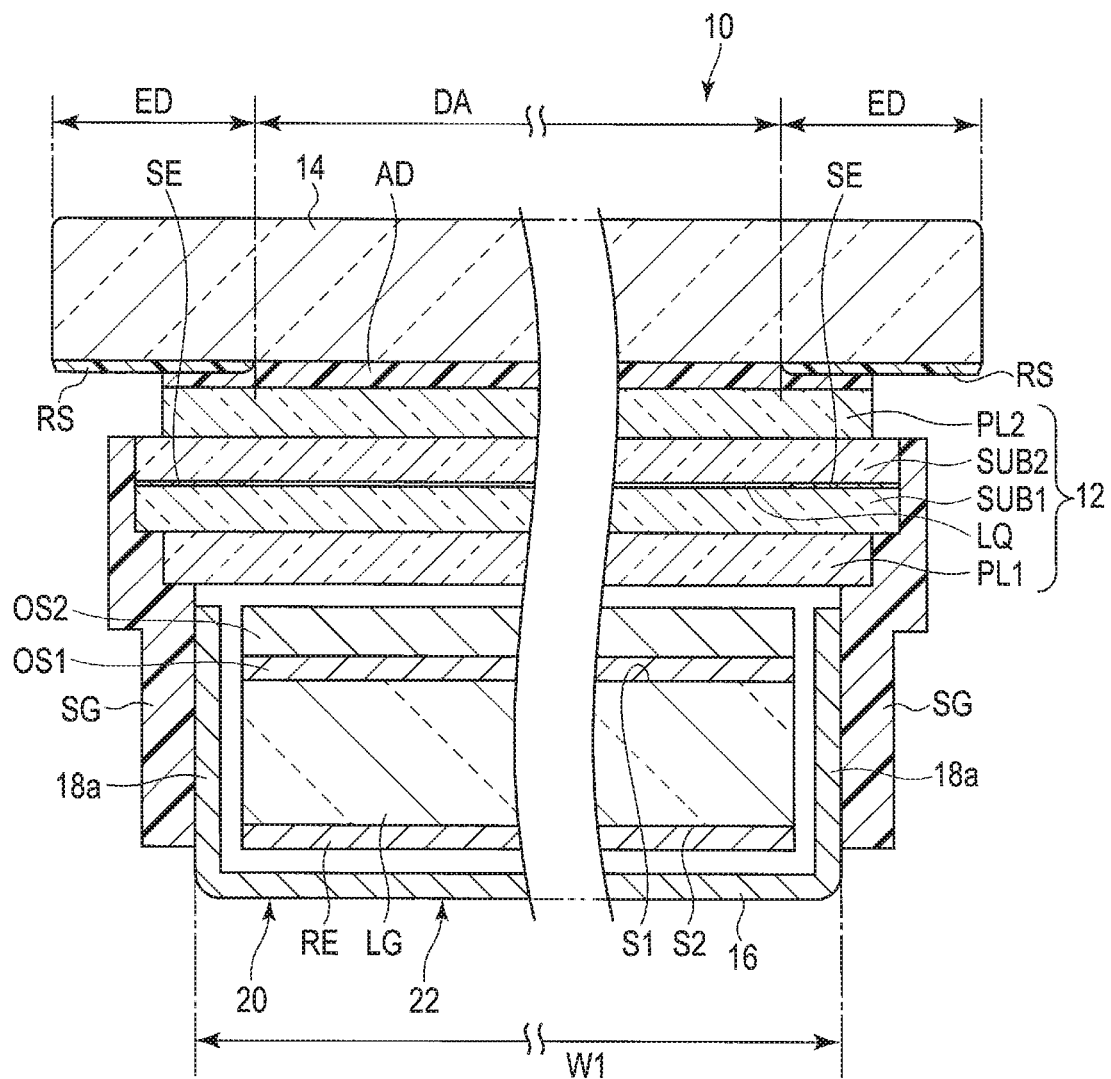
FIG. 8 is a lateral sectional view of the liquid crystal display device taken along line B-B of FIG. 1.

FIG. 7 is a longitudinal sectional view of the liquid crystal display device taken along line A-A of FIG. 1. FIG. 8 is a lateral sectional view of the liquid crystal display device taken along line B-B of FIG. 1. As shown in FIGS. 4, 7 and 8, the backlight device 20 includes, as optical members, a reflective sheet RE, a light guide LG, a plurality of, for example, two, first optical sheets OS1 and second optical sheets OS2, which have a rectangular shape in planar view. The number of optical sheets is not limited to two, but three or more sheets may be used.

The reflective sheet RE is formed to have outer dimensions substantially equal to the inner dimensions of the bottom plate 16. The reflective sheet RE is laid on the bottom plate 16 to cover the entire surface thereof.

The rectangular light guide LG comprises a first main surface S1 which is a light-emitting surface, a second main surface S2 on an opposite side to the first main surface S1 and a plurality of, for example, a pair of long-side surfaces and a pair of short-side surfaces, which connect side edges of the first main surface S1 and the second main surface S2 to each other. In this embodiment, one short-side surface of the light guide LG constitutes an incidence surface EF. The light guide LG has, for example, a thickness of about 0.23 to 0.32 mm. Moreover, the light guide LG is formed from, for example, a resin such as polycarbonate, an acrylic or silicon resin.

The light guide LG has dimensions (length and width) slightly smaller than the internal dimensions of the case 22 and slightly larger than the display area DA of the liquid crystal panel 12 in plan view. The light guide LG is disposed in the case 22 with the second main surface S2 side opposing the reflective sheet RE. Thereby, the first main surface (emission surface) S1 of the light guide LG is located substantially parallel to the reflective sheet RE and the incidence surface EF is located substantially perpendicular to the reflective sheet RE.

As shown in FIG. 7, an incidence-side end of the light guide LG extends towards the light source side with respect to the display area DA of the liquid crystal panel 12. The incidence surface EF opposes the short-side plate 18b with a slight gap interposed therebetween. The distance between the incidence surface EF and the short-side plate 18b is preferably 1.0 mm or less, more preferable 0.8 mm or less, and still more preferably, 0.5 mm or less. The short-side surface on the other side of the light guide LG opposes the frame member 32 of the case 22 with a slight gap interposed therebetween.

As shown in FIG. 8, the pair of long-side surfaces of the light guide LG directly oppose the long-side plate 18a of the case 22 each with a slight gap therebetween. That is, the long-side surfaces of the light guide LG oppose the long side plates 18a with a slight gap therebetween without interposing the frame member there. In other words, each of the long-side plates 18a is located closer to the side surfaces of the light guide LG by the thickness of the frame member. With this structure, as described above, the width W1 between the long-side plates 18a is formed smaller than the width of the liquid crystal panel 12.

As shown in FIGS. 4, 7 and 8, according to this embodiment, a diffusion sheet is used as the first optical sheet OS1, and a prism sheet is used as the second optical sheet OS2. The first optical sheet OS1 is formed into a rectangular shape having slightly greater (longer) outer dimensions than those of the light guide LG. The first optical sheet OS1 is overlaid on the first main surface S1 of the light guide LG. One short-side end of the first optical sheet OS1 projects over the light guide LG to the light source unit 50 side. This end is attached to the first main surface S1 of the light guide LG with a light-shielding tape TP4 of, for example, a double-sided type. The second optical sheet OS2 is overlaid on the first optical sheet OS1.

Figure 6:
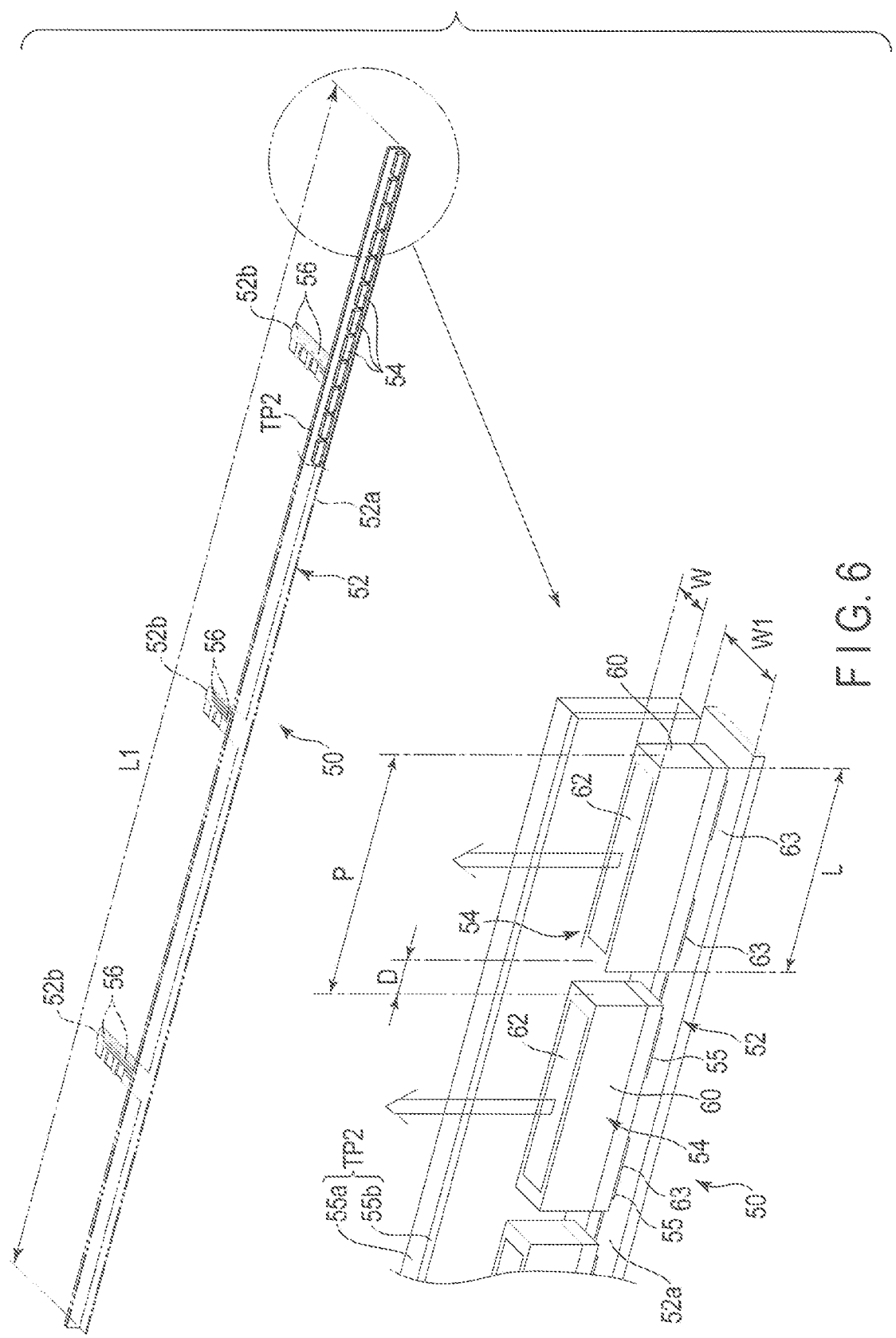
FIG. 6 is a perspective view showing a light source unit of the backlight device.

FIG. 6 is a perspective view of the light source unit, together with an enlarged perspective view showing a part of the light source unit. As shown, the light source unit 50 comprises, for example, a belt-shaped wiring board 52 and a plurality of light sources mounted in lines on the wiring board 52. As light sources, light-emitting elements, for example, light-emitting diodes (LEDs) 54 are employed.

The wiring board 52 includes a belt-shaped mounting portion (mounting region) 52a and a plurality of, for example, three belt-shaped lead-out portions (wiring regions) 52b extending substantially perpendicularly from one side edge of the mounting portion 52a, all integrated as one body. A length L1 of the mounting portion 52a is substantially equal to a length of the incidence surface EF of the light guide LG. A width W1 of the mounting portion 52a is, for example, about 0.6 to 1 mm. The three lead-out portions 52b are arranged to be spaced from each other in a longitudinal direction of the mounting portion 52a. A plurality of contact pads 55 are formed in the mounting portion 52a and are arranged in a longitudinal direction of the mounting portion 52a. A plurality of wiring lines 56 are routed out from the contact pads 55 to the lead-out portions 52b of the wiring board 52, respectively.

The LEDs 54 used here are each a top-view type LED. Each LED 54 comprises a substantially rectangular parallelepiped case (package) 60 formed of a resin, for example. An upper surface of the case 60 forms a light-emitting surface 62 and a bottom surface of the case 60, which is located on an opposite side to the light-emitting surface 62, forms a mounting surface. That is, contact terminals 63 are provided on the bottom surface of the case 60.

Note that each LED 54 is formed into substantially a rectangular parallelepiped, but the shape is not limited to this. For example, the LED 54 may comprise projections and recesses in side surfaces, or may be formed into a curvy shape.

As to each LED 54, the bottom of the case 60 is mounted on the mounting portion 52a of the wiring board 52, and thus the contact terminals 63 are electrically connected to the contact pads 55. The light-emitting surface 62 is set substantially parallel to the surface of the wiring board 52, and the LED 54 emits light from the light-emitting surface 62 in a direction substantially perpendicular to the wiring board 52.

The LEDs 54 are mounted on the mounting portion 52a so that the longitudinal direction of the case 60 is aligned with the longitudinal direction of the mounting portion 52a. The width W1 of the mounting portion 52a is 1.1 to 1.5 times the width W of the LED 54. In this embodiment, the light source unit 50 includes thirty to fifty LEDs 54, the number of which may vary according to the width of the display area DA and the width of the LEDs 54. The number of the LEDs installed is about 2.5 to 3 times that of the conventional structure of the same display area. The LEDs 54 are arranged in one row on the mounting portion 52a from one longitudinal end to the other of the mounting portion 52a.

Note that in this embodiment, an arrangement pitch P of the LEDs 54 is set to about 1.1 to 1.5 times of the length L of each LED 54 in the aligning direction, and a gap D of each adjacent pair of LEDs 54 is set to about 10% to 50% of the length L of the LEDs 54. Conventionally, the arrangement pitch of LEDs is set to two times or more the length of the LEDs. In this embodiment, the gap D between the LEDs 54 is set narrower than conventional cases, and thus the region of uneven brightness, which may occur between each adjacent pair of light sources, can be narrowed.

In this embodiment, a belt-shaped fixing tape (light-shielding tape) TP2 as an adhesive member for fixing and positioning each LED 54 is adhered onto side surfaces of a plurality of LEDs 54. The fixing tape TP2 is used such that about a half of the region in a width direction is adhered to the LEDs 54, and a remaining half of the region is adhered to the light guide LG. The fixing tape TP2 comprises a belt-shaped base material 55a formed of, for example, polyethylene terephthalate (PET), and an adhesive layer 55b or sticker layer formed on at least one surface of the base material 55a. Further, at least one of the base material 55a and the adhesive layer 55b is colored in black with, for example, fine black particles, black ink or the like. Thus, the fixing tape TP2 forms a light-shielding member (light-shielding tape) with light-shielding function. The fixing tape TP2 employed here is not limited to one continuous tape, but may be of a plurality of divided fixing tapes.

As shown in FIG. 7, the light source unit 50 configured as described above is disposed in the case 22. The mounting portion 52a of the wiring board 52 and the LEDs 54 are arranged between the incidence surface EF of the light guide LG and the short-side plate 18c of the case 22. The light-emitting surfaces 62 of the LEDs 54 oppose the incidence surface EF with a slight gap therebetween, or are brought into contact with the incidence surface EF. The mounting portion 52a is adhered to the inner surface of the short-side plate 18c with an adhesive member, for example, the double-sided tape TP3. The mounting portion 52a opposes the incidence surface EF via the LEDs 54 interposed therebetween.

The LEDs 54 each comprises four side surfaces normally crossing the light-emitting surface 62. Of the four side surfaces, a side surface 54b located on a bottom plate 16 side is arranged to be substantially flush with the second main surface S2 of the light guide LG. The fixing tape TP2 is adhered over from these side surfaces 54b to the second main surface S2. The fixing tape TP2, more specifically, about a half of the region in its width direction, is adhered on the side surfaces 54b, and the rest of the half is adhered onto an incidence surface-side end of the first main surface S1. Thus, the LEDs 54 are fixed to the light guide LG via the fixing tape TP2, and the light-emitting surfaces 62 are positioned to be in contact with the incidence surface EF of the light guide LG. Further, the fixing tape TP2 shields the side surface 54b side of each LED 54 to inhibit light from leaking from the LEDs 54.

According to this embodiment, the base material 55a of the fixing tape TP2 is provided to be in contact with or adhered to the inner surface of the bottom plate 16. The fixing tape TP2 is interposed between the bottom plate 16 and the LED 54 and held to attach to the LED 54 and the light guide LG.

Note that the lead-out portions 52b of the wiring board 52 is inserted to a slit (not shown) formed in the bottom plate 16 of the case 22. The lead-out portions 52b is curved or bent to a bottom plate 16 side by substantially 90 degrees, to oppose to be adjacent to the back of the bottom plate 16.

As shown in FIG. 7, a light source-side end of the first optical sheet OS1 extends from a position opposing the light guide LG to a position opposing the LED 54. The fixing tape TP4 is attached to the end portion of the first optical sheet OS1. A part of the fixing tape TP4 is adhered on the first main surface S1 of the light guide LG to fix the end portion of the first optical sheet OS1 to the light guide LG. Further, in FIG. 7, a part of the fixing tape TP4 opposes an upper side end of the LED 54. The fixing tape TP2 may be colored in black with, for example, fine black particles, black ink or the like, to have a light-shielding function.

As shown in FIGS. 3, 7 and 8, the backlight unit 20 is adhered to the back of the liquid crystal panel 12 by belt-shaped double-sided tapes TP1 and TP5. Further, the three side plates of the case 22 other than the short-side plate 18c on the light source side, that is, more specifically, a pair of long-side plates 18a and a short-side plate 18b are adhered to corresponding three sides of the liquid crystal panel 12 by the adhesives layer (glue) SG. The second optical sheet OS2 opposes the entire first polarizer PL1 with a gap therebetween. The light source unit 50 is located to overlap the non-display area ED of the liquid crystal panel 12.

The double-sided tape TP1 extends along the short-side plate 18c of the case 22, and is adhered onto the frame member 32 and the pair of resin members 30b. An opposite surface of the double-sided tape TP1 is adhered to the short-side end portion of the first polarizer PL1 of the display panel 12. The double-sided tape TP5 is adhered to the light source-side end of the second optical sheet OS2, and extends along the short-side plate 18c. An opposite surface of the double-sided tape TP5 is adhered to the light source-side end of the first polarizer PL1. A spacer 70 is interposed between the first substrate SUB1 and the double-sided tape TP5 on an outer side of the first polarizer PL1. The spacer 70 has the same thickness as that of the first polarizer PL1 and fills the gap between the double-sided tape TP5 and the first substrate SUB1. Note that such a configuration that the first polarizer PL1 and the spacer 70 are formed to be integrated as one body is adoptable as well. In such a case, the first polarizer PL1 may be formed to extend to the end portion of the first substrate.

The adhesives layer SG is applied on from outer surfaces of the pair of long-side plates 18a, an outer surface of the short-side plate 18b, a side surface of the first polarizer PL1 of the liquid crystal panel 12, a side surface of the first substrate SUB1, over to a side surface of the second substrate SUB2. The adhesives layer SG is formed from a resin adhesive colored in black with, for example, fine black particles or black ink and has a light-shielding function. The gap between the backlight unit 20 and the liquid crystal panel 12 is covered by the adhesives layer SG so as to prevent leakage of light. The adhesives layer SG has adhesion about 3 times that of the double-sided tapes and therefore the backlight unit 20 can be firmly adhered to the liquid crystal panel 12 and also the strength of the liquid crystal display 10 as a whole can be enhanced.

As described above, the long-side plate 18a of the case 22 is located on the inner side, that is, on a lightguide LG side, by an equivalent space for that the resin frame, which is not present here, and therefore the width W1 between the pair of long-side plates 18a is comparatively less. Therefore, even if the adhesives layer SG is applied to the outer surface of the long-side plate 18a, the thickness of the adhesives layer SG is offset by the equivalent portion that the long-side plate 18a is located on the inner side. With this structure, the overall width of the liquid crystal display 10 does not increase.

As shown in FIGS. 2 and 7, the main FPC23 and the sub FPC25 extending from the liquid crystal panel 12 are folded back to the rear surface side of the bottom plate 16 along the short-side plate 18c of the case 22. The main FPC23 and the sub FPC25 are adhered to a heat-radiating sheet or the bottom plate 16 with an adhesive member (not shown).

According to the liquid crystal display 10 configured as above, the corner portions of the sheet metal-made case 22 are formed from the resin members 18a and 18b. With this structure, the radius of curvature of the corner portions can be reduced and therefore, the installation space in the case can be increased. Moreover, the corner portions are not wrinkled, for example, and therefore the leakage of light from the corner portions of the case can be prevented. Since the resin frame members along the long-side plates can be omitted, the width of the case can be reduced. As a result, the frame of each of the backlight unit 20 and the liquid crystal display 10 can be narrowed. Thus, according to this embodiment, a thin backlight device with a narrow frame and a display device comprising such a backlight can be obtained.

Next, a liquid crystal display device according to another embodiment will be explained. In this embodiment described below, the same structural elements as those of the first embodiment are denoted by like reference numbers, and detailed description thereof will be omitted or simplified. Structural elements different from those of the first embodiment will be mainly explained in detail.

Second Embodiment

Figure 9:
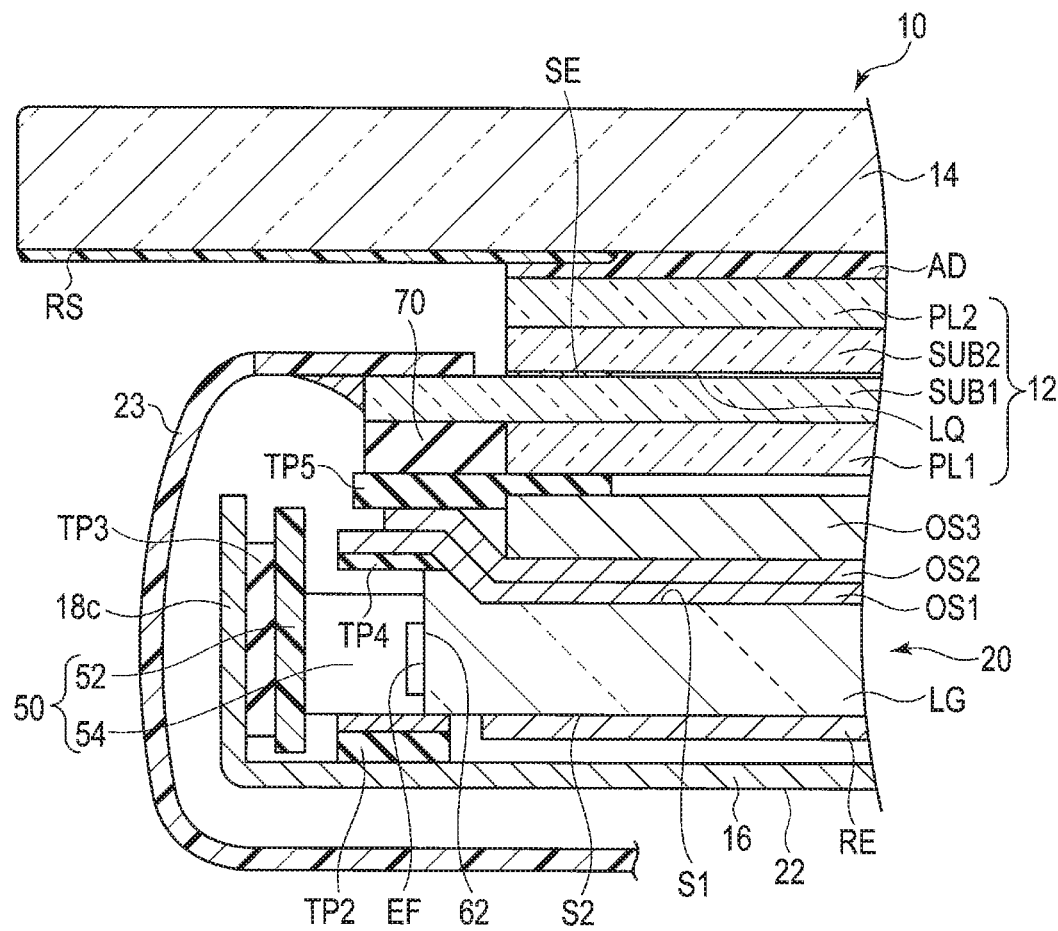
FIG. 9 is a cross sectional view showing a light source-side portion of a liquid crystal display device according to a second embodiment.

FIG. 9 is a cross section of a light source-side end portion of a liquid crystal display according to the second embodiment. According to the second embodiment, the backlight unit 20 comprises three optical sheets OS1, OS2 and OS3. As the first optical sheets OS1, a diffusion sheet is employed, whereas two prism sheets are employed as the optical sheets OS2 and OS3. The three optical sheets OS1, OS2 and OS3 are overlaid on the first main surface S1 of the light guide LG to stack on one on another in this order.

The first main surface S1 of the light guide LG is recessed by one step by the thickness of the optical sheets except for its end portion on the side of the incidence surface EF. That is, in the light guide LG, the thickness of the part other than the incidence surface EF-side end portion is less than the thickness of the incidence surface EF-side end portion. With this configuration, the first main surface S1 is formed to comprise a tapered portion in the incidence surface EF side. The second main surface S2 is formed flat.

With the structure in which the optical sheets OS1, OS2 and OS3 are stacked on the first main surface S1 of the light guide LG, the increase in thickness, which is caused by the increase in the number of optical sheets, can be absorbed, and thus the increase in the total thickness of the backlight unit 20 can be suppressed. Note that the width (height) of the incidence surface EF is maintained by such a dimension as to oppose or be in contact with the entire surface of the light-emitting surface 62 of each LED 54. Therefore, even if the light guide LG is formed thin, the light emitted from each LED 54 can be allowed to enter the light guide LG in an excellent manner.

According to the second embodiment, the number of optical sheets can be increased without increasing the thickness of the backlight unit 20. Here, two independent prism sheets OS2 and OS3 are used, and thus the brightness of the backlight unit 20 can be improved. In the second embodiment, the other structure of the backlight unit 20 and the liquid crystal display 10 is identical to that of the first embodiment described above.

Third Embodiment

FIG. 10 is a cross-sectional view of a light source-side end portion of a liquid crystal display according to the third embodiment. According to the third embodiment, the reflective sheet RE comprises, in the backlight unit 20, a light source-side end portion RE2 extending over the incidence surface FE of the light guide LG to a position opposing a side surface of each LED 54. In this embodiment, the light source-side end portion RE2 extends to a position where it is brought into contact with the wiring substrate 52 of the light source unit 50, to cover the side surface (the side surface on a bottom plate 16 side) of each LED 54.

Further, in place of the light-shielding tape, a transparent adhesive layer or a transparent adhesive tape 72, which has light transmissivity, is adhered to the side surface of each LED 54 and the second main surface of the light guide LG. With the adhesive tape 72, each LED 54 is fixed to and position with respect to the respective light guide LG. The light source-side end portion RE2 of the reflective sheet RE is overlaid on the adhesive tape 72 and opposes the LED 54 via the adhesive tape 72. The double-sided tape TP5 which has light-shielding property is adhered to a light source-side end portion of the second optical sheet OS2, and extends along an outer side of the short-side plate 18c.

In the third embodiment, the other structure of the backlight unit 20 and the liquid crystal display 10 is identical to that of the first embodiment described above. According to the third embodiment, the reflective sheet RE extends to the position opposing the LED 54. With this structure, light which may leak from the LED 54 is reflected to the light guide LG side by the reflective sheet RE, thereby making it possible to utilize the leaking light as incidence light to enter the light guide LG. Thus, the brightness of the backlight unit 20 can be improved.

Fourth Embodiment

Figure 11:
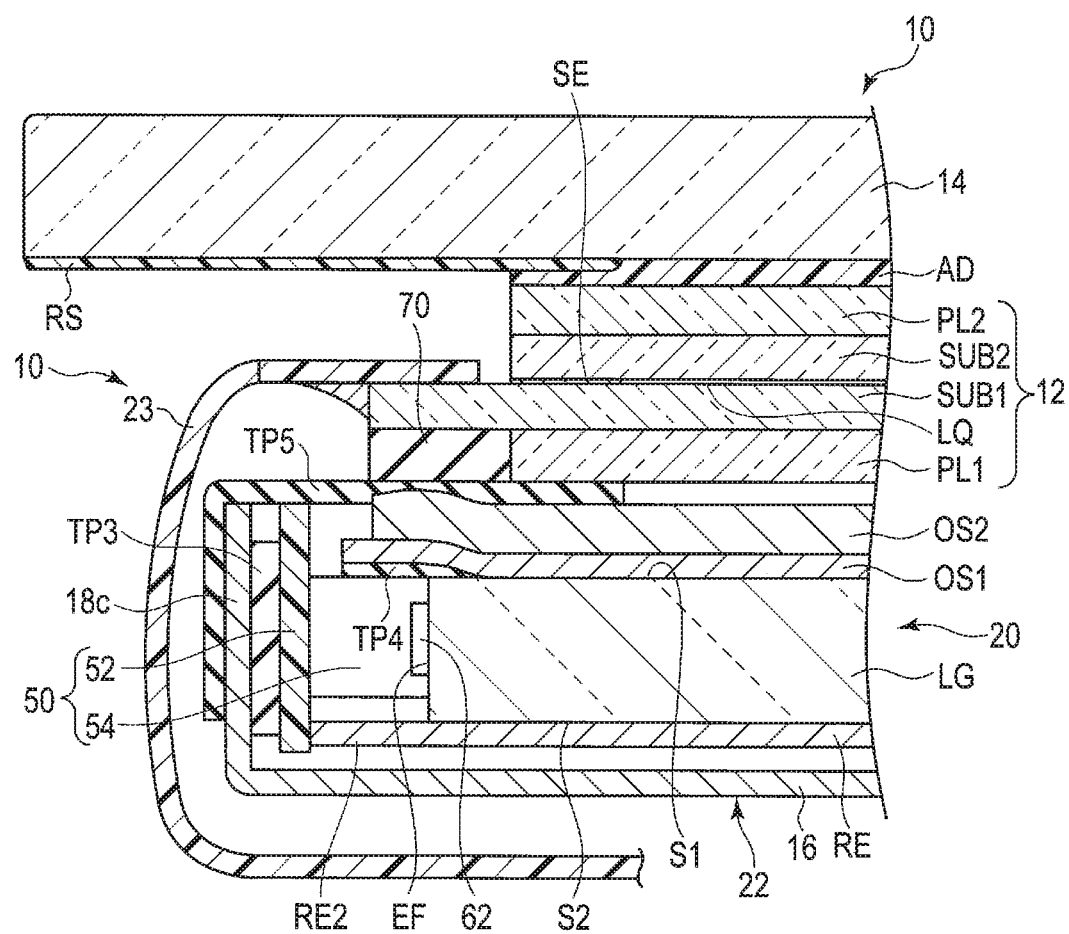
FIG. 11 is a cross sectional view showing a light source-side portion of a liquid crystal display device according to a fourth embodiment.

FIG. 11 is a cross-sectional view of a light source-side end portion of a liquid crystal display according to the fourth embodiment. According to the fourth embodiment, the reflective sheet RE comprises, in the backlight unit 20, a light source-side end portion RE2 extending over the incidence surface FE of the light guide LG to a position opposing a side surface of each LED 54. The light source-side end portion RE2 extends parallel to the second main surface S2 of the light guide LG to a position to be brought into contact with the wiring substrate 52 of the light source unit 50. Thus, the light source-side end portion RE2 covers the side surface (the side surface on the bottom plate 16 side) of the LED 54.

The light source unit 50 is located at a position slightly shifted to the liquid crystal panel 12 side, and the upper side surface of the LED 54 (the side surface on the liquid crystal panel 12 side) is disposed to be flush with the first main surface S1 of the light guide LG. The light-shielding tape TP4 is adhered to from the side surface of the LED 54 over to the first main surface of the light guide LG. The LED 54 is fixed to and positioned with respect to the light guide LG by the light-shielding tape TP4.

An end portion of the optical sheet OS1 is overlaid and adhered on the light-shielding tape TP4. The double-sided tape TP5 which has light-shielding property is adhered to a light source-side end portion of the second optical sheet OS2, to extend along the short-side plate 18c. In this embodiment, the double-sided tape TP5 extends to an outer side of the short-side plate 18c of the case 22, and is adhered to the outer surface of the short-side plate 18c. Thus, the double-sided tape TP5 covers the light source unit 50.

In the fourth embodiment, the other structure of the backlight unit 20 and the liquid crystal display 10 is identical to that of the first embodiment described above. According to the fourth embodiment, the reflective sheet RE extends to the position opposing the LED 54. With this structure, light which may leak from the LED 54 is reflected to the light guide LG side by the reflective sheet RE, thereby making it possible to utilize the leaking light as incidence light to enter the light guide LG. Thus, the brightness of the backlight unit 20 can be improved.

Moreover, the liquid crystal panel 12 side of the LED 54 is covered by the double-sided tape TP4 and the double-sided tape TP5. Thus, light may leak from the LED 54 can be shielded, and thus unnecessary leakage of light can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Note that all the structures and production steps which can be carried out by any modification and variation conceived within the scope and spirit of the invention by a person having ordinary skill in the art based on each structural elements described in the embodiments are naturally encompassed in the scope of invention of the present application. Further, regarding the present embodiments, any advantage and effect which would be obvious from the description of the specification or arbitrarily conceived by a skilled person are naturally considered achievable by the present invention.

The outer and inner shapes of the structural members of the liquid crystal panel and backlight unit are not limited to rectangular, but one or both of the outer and inner shapes may be polygonal, circular, elliptical or combination of any of these in plan view. The materials of the structural members are not limited to those described in the example provided above, but may be selected from various types. The liquid crystal panel is not limited to a flat type, but may be partially or entirely curved.

What is claimed is:

1. A backlight device comprising:
a case comprising a bottom plate formed of a metal plate, a pair of first side plates opposing each other and formed of metal plates alongside edges of the bottom plate, a pair of second side plates opposing each other and formed of metal plates alongside edges of the bottom plate, and a plurality of resin members including two first resin members formed into two corner portions embedded respectively in gaps between each of the first side plates and one of the second side plates, two second resin members formed into two corner portions embedded respectively in gaps between each of the first side plates and an other of the second side plates, and a frame member jointing the two second resin members together and formed integrally with the second resin member as one body by a resin, the frame member extending along an inner surface of the other second side plate;
a reflective sheet placed on the bottom plate;
a light guide comprising a first main surface which forms an emission surface, a second main surface on an opposite side of the first main surface, and a plurality of side surfaces connecting the first main surface and the second main surface, the light guide being arranged in the case while the second main surface opposes the reflective sheet, wherein the plurality of side surfaces of the light guide include a side surface opposing the one of the second side plates with a gap therebetween and forming an incidence surface, a pair of side surfaces directly opposing the first side plates, respectively, and an opposite side surface opposite to the incidence surface and entirely opposing the frame member;
an optical sheet on the light guide; and
a light source unit in the case, configured to emit light to enter the incidence surface of the light guide.

2. The backlight device of claim 1, wherein
the first resin members and the second resin members comprise curved outer surfaces, respectively, which are flush with outer surfaces of the first side plate and outer surfaces of the second side plates.

3. The backlight device of claim 1, wherein
the light source unit comprises a wiring substrate fixed to the one of the second side plates and opposing the incidence surface, and a light source mounted on the wiring substrate and opposing the incidence surface.

4. The backlight device of claim 3, wherein
the light source comprises a plurality of light-emitting devices each comprising a light-emitting surface opposing or in contact with the incidence surface.

5. The backlight device of claim 3, wherein
the reflective sheet includes a light source-side end portion extending over the incidence surface of the light guide to a position opposing the light source.

6. The backlight device of claim 5, wherein
the light source is fixed to the light guide with an adhesive member with transparency, adhered on the plurality of light-emitting devices over to the second main surface of the light guide, and the light source-side end portion of the reflective sheet opposes the plurality of the light-emitting devices via the adhesive member.

7. A liquid crystal display device comprising:
a liquid crystal panel comprising a first substrate, a second substrate opposed to the first substrate, and a liquid crystal layer between the first substrate and the second substrate; and
a backlight device provided to oppose the first substrate, the backlight device comprising:
a case comprising a bottom plate formed of a metal plate, a pair of first side plates opposing each other and formed of metal plates alongside edges of the bottom plate, a pair of second side plates opposing each other and formed of metal plates alongside edges of the bottom plate, and a plurality of resin members including two first resin members formed into two corner portions embedded respectively in gaps between each of the first side plates and one of the second side plates, two second resin members formed into two corner portions embedded respectively in gaps between each of the first side plates and an other of the second side plates, and a frame member jointing the two second resin members together and formed integrally with the second resin member as one body by a resin, the frame member extending along an inner surface of the other second side plate;
a reflective sheet placed on the bottom plate;
a light guide comprising a first main surface which forms an emission surface, a second main surface on an opposite side to the first main surface, and a plurality of side surfaces connecting the first main surface and the second main surface, the light guide being arranged in the case while the second main surface opposes the reflective sheet, wherein the plurality of side surfaces of the light guide include a side surface opposing the one of the second side plates with a gap therebetween and forming an incidence surface, a pair of side surfaces directly opposing the first side plates, respectively, and an opposite side surface opposite to the incidence surface and entirely opposing the frame member;
an optical sheet on the light guide; and
a light source unit in the case, configured to emit light to enter the incidence surface of the light guide.

8. The liquid crystal display device of claim 7, further comprising an adhesive layer formed on outer surfaces of the pair of the first side plates, an outer surface of the other one of the second side plates of the case and a corresponding side surface of the liquid crystal panel,
wherein
the pair of the first side plates, and the outer surface of the other one of the second side plates are adhered to the liquid crystal panel by the adhesive layer.

9. The liquid crystal display device of claim 7, further comprising an adhesive layer formed on outer surfaces of the pair of the first side plates, an outer surface of the other one of the second side plates of the case and a corresponding side surface of the liquid crystal panel,
wherein
the pair of the first side plates, and the outer surface of the other one of the second side plates are adhered to the liquid crystal panel by the adhesive layer.

10. The liquid crystal display device of claim 7, wherein the first resin members and the second resin members comprise curved outer surfaces, respectively, which are flush with outer surfaces of the first side plate and outer surfaces of the second side plates.

* * * * *